Oct. 29, 1935.  M. TEEL  2,019,369
HARROW
Filed Nov. 5, 1934  2 Sheets-Sheet 1
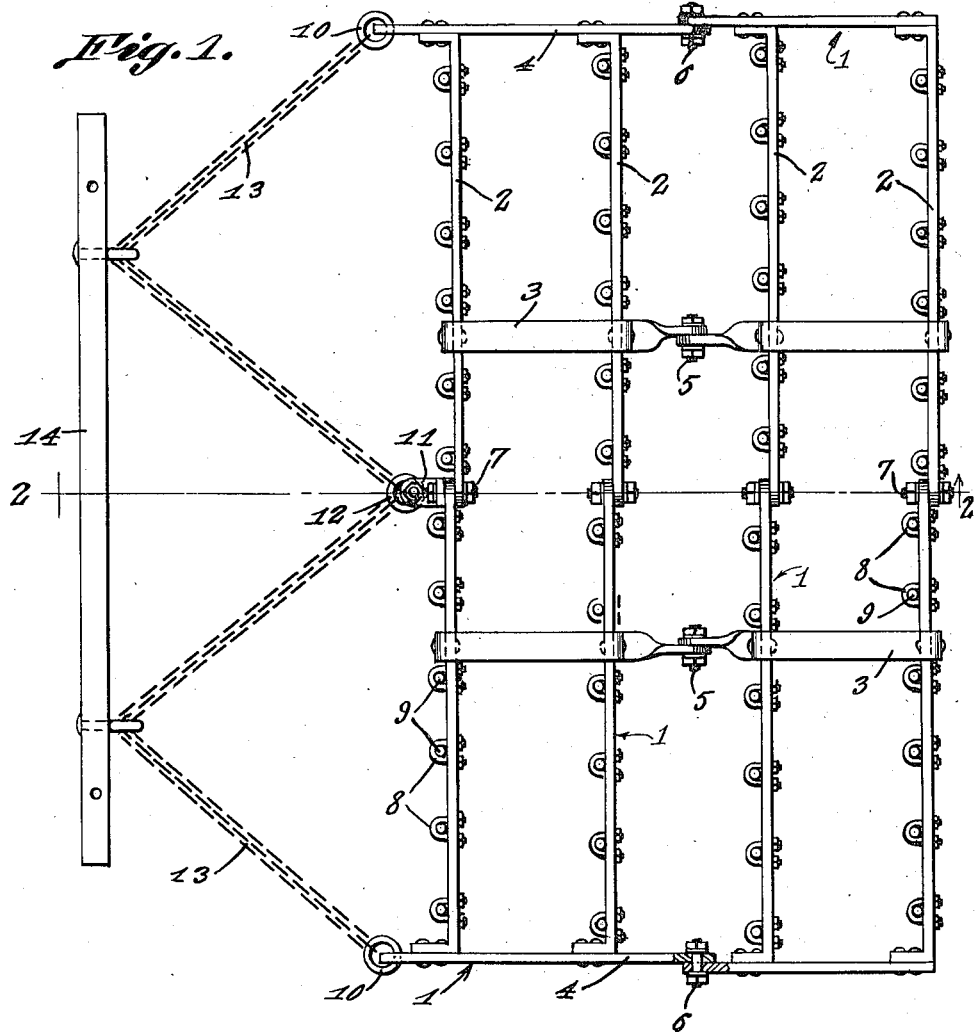
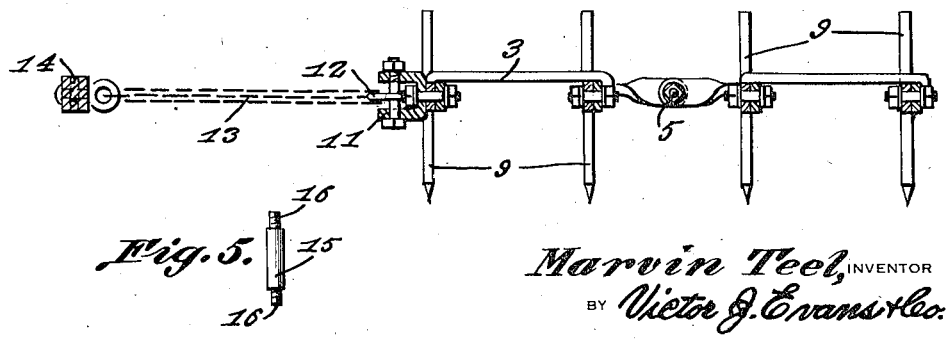
Marvin Teel, INVENTOR
BY Victor J. Evans & Co.
ATTORNEY Oct. 29, 1935.  M. TEEL  2,019,369
HARROW
Filed Nov. 5, 1934  2 Sheets-Sheet 2
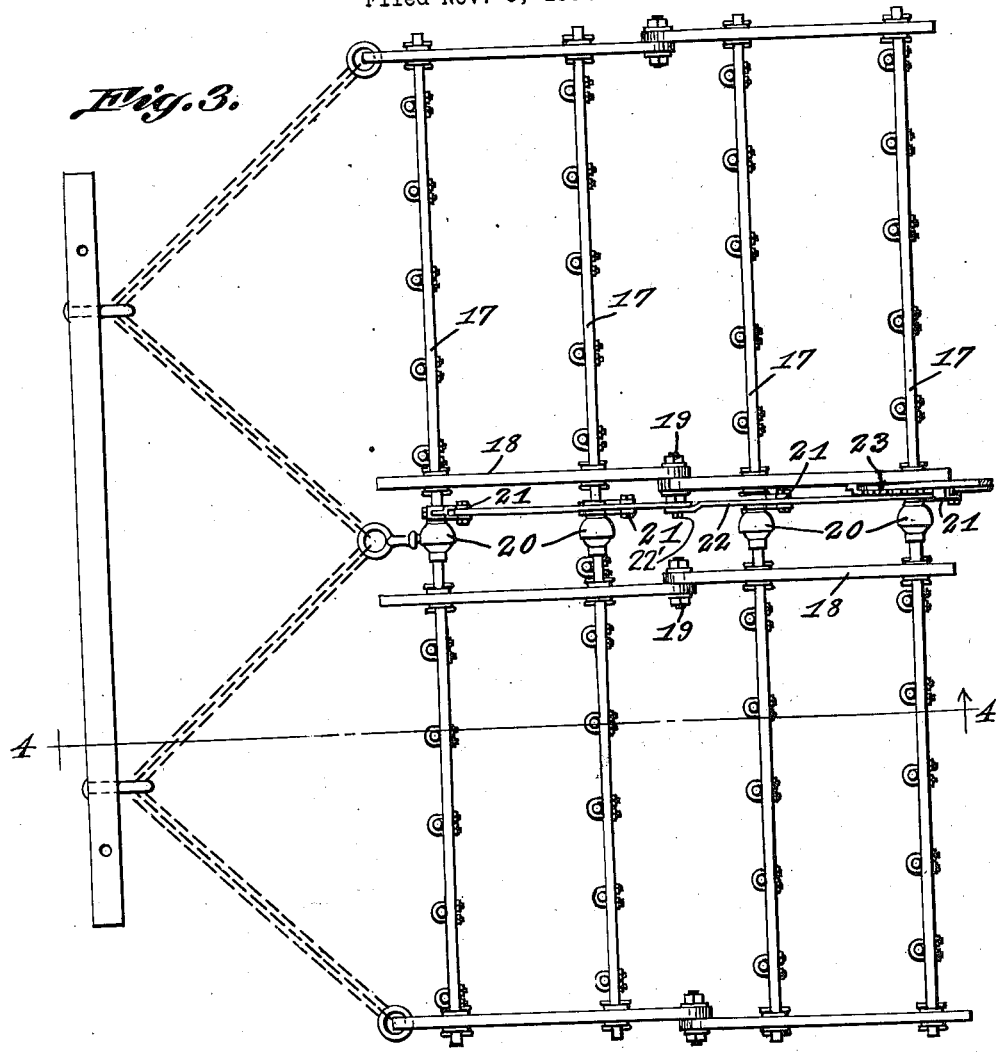
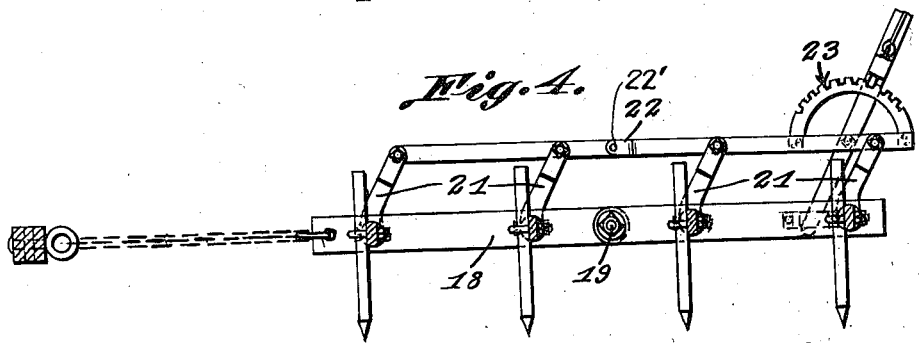
Marvin Teel, INVENTOR
BY Victor J. Evans & Co.
ATTORNEY Patented Oct. 29, 1935

2,019,369

UNITED STATES PATENT OFFICE 2,019,369

HARROW

Marvin Teel, Millerville, Ala.

Application November 5, 1934, Serial No. 751,642

1 Claim. (Cl. 55—32)

This invention relates to harrows and has for the primary object the provision of a device of this character which will till or agitate all of the soil within the path of movement of the device and the latter due to its construction will readily flex when passing over uneven ground and also will permit folding thereof into a compact device for transportation and storage when desired.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a plan view illustrating a harrow constructed in accordance with my invention.

Figure 2 is a sectional view taken on the line 2—2 of Figure 1.

Figure 3 is a top plan view illustrating a modified form of my invention.

Figure 4 is a sectional view taken on the line 4—4 of Figure 3.

Figure 5 is a detail view illustrating a connecting element.

Referring in detail to the drawings, the numeral 1 indicates a plurality of frames each including teeth supporting bars 2 and connecting bars 3 and 4. The frames 1 are grouped or arranged in forward and rearward pairs, the bars 3 of the forward pairs being hinged to the bar 3 of the rearward pairs, as shown at 5. The connecting bars 4 of the forward and rearward pairs are hingedly connected, as shown at 6. The tooth carrying bars 2 are hingedly connected, as shown at 7. Thus it will be seen that the frames are capable of hinging one relative to another so as to provide the device with maximum flexibility and which also will permit the pairs of frames to be folded one upon the other rendering the device compact when it is desired to transport or store the same.

A plurality of U-clamps 8 are removably mounted to the bars 2 and detachably secure thereto teeth 9. The teeth are so arranged on the bars that the teeth of one bar will not track the teeth of the bar adjacent thereto whereby the device will act to till or cultivate the entire amount of soil within the path of movement of the device. The connecting bars 4 of the forward or front pair of frames are apertured to receive rings 10 and the forward hinge between the bars 2 of the forward pair of frames has connected thereto a clip 11 carrying a ring 12. Flexible elements 13 are connected to the rings and pass through eye bolts of a double tree 14 to which may be connected draft animals by the employment of single trees or if desired, a tractor or like device may be connected to the double tree. The connecting elements of the hinges heretofore described are each preferably formed of an element 15 having screw threaded ends 16 on which nuts are threaded.

Referring to my modified form of invention, the teeth supporting bars 17 are journaled to the connecting bars 18, the latter being hingedly connected, as shown at 19. The adjacent ends of the teeth supporting bars 17 are connected by ball and socket joints 20. Arms 21 are secured to the teeth supporting bars and said arms are pivotally connected to links 22 forming part of teeth adjusting mediums 23. Through the mediums 23 the pitch of the teeth may be varied. My modified form of invention is capable of folding similar to the forms described in Figures 1 and 2, the links 22 being detachably connected, as shown at 22', to permit folding of the device.

Having described the invention, I claim:

A harrow comprising pairs of forwardly and rearwardly arranged frames, each including an end member and a pair of parallel supporting bars secured to said end member and extending at right angles thereto, a connecting bar for each frame and securing together in spaced relation the supporting bars thereof, means hinging together the connecting bars of the forward frames with the connecting bars of the rearward frames, means hingedly connecting the end members of the forward and rearward frames, hinges connecting the supporting bars of the rearward frames, a draft connecting means connected to the forward frames, and teeth secured to said supporting bars.

MARVIN TEEL.